W. POPPENDIECK.
CHRISTMAS TREE STAND.
APPLICATION FILED APR. 8, 1910.
982,866.
Patented Jan. 31, 1911.
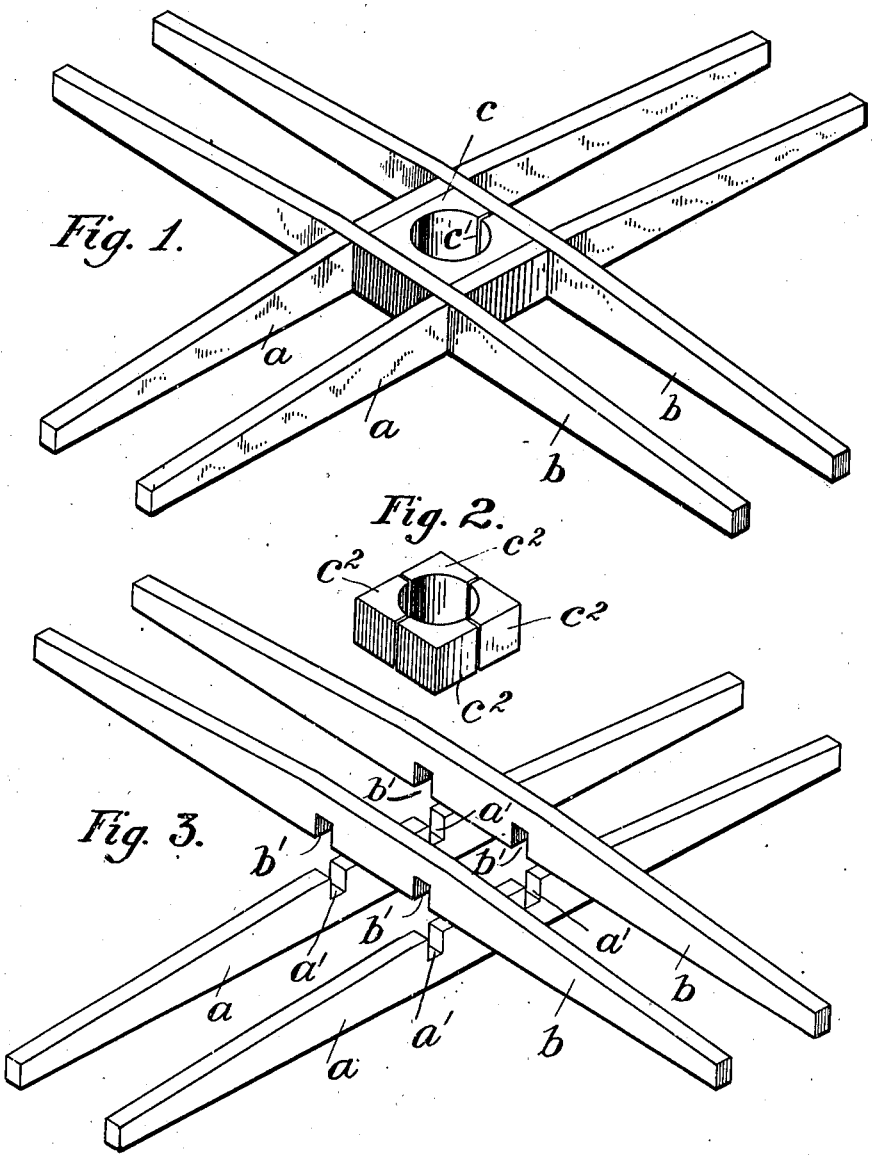
WITNESSES:
INVENTOR
William Poppendieck
BY
ATTORNEY

UNITED STATES PATENT OFFICE.

WILLIAM POPPENDIECK, OF CARLSTADT, NEW JERSEY, ASSIGNOR OF ONE-HALF TO JAMES E. SIMPSON, OF BROOKLYN, NEW YORK.

CHRISTMAS-TREE STAND.

982,866.  Specification of Letters Patent. Patented Jan. 31, 1911.

Application filed April 8, 1910. Serial No. 554,309.

*To all whom it may concern:*

Be it known that I, WILLIAM POPPENDIECK, a citizen of the United States, and resident of Carlstadt, New Jersey, have invented certain new and useful Improvements in Christmas-Tree Stands, of which the following is a specification.

This invention relates to stands or holders for Christmas trees and the like, and my improvement comprises certain novel features of construction and arrangements of parts including: (1) a separable socket portion possessing the characteristic of expanding within its confines to tightly seat a tree butt or like object therein; (2) means detachably uniting the members of the stand in manner to confine the expansible socket.

In the drawing accompanying this application, Figure 1 is a perspective plan view of my improved stand. Fig. 2 is a similar view of a socket, and Fig. 3 is a similar view of the stand members detached.

In said figures the letters $a$ $a$ indicate the lower and $b$ $b$ the upper members of the stand. The members $a$ $a$, which may be strips of wood or other desirable material, of suitable length, are arranged in parallelism, and have alined transverse recesses $a'$ $a'$ extending downwardly from their upper surfaces. Superimposed transversely upon the strips $a$ $a$ are like strips $b$ $b$, also arranged in parallelism, and having undercut, alined, transverse recesses $b'$ $b'$. For transportation the strips $a$ $a$, $b$ $b$ may be laid lengthwise and tied in a compact bundle, but when in use the strips are arranged as shown in the drawing, fitting together, in the indicated manner; the recesses $b'$ $b'$ in each strip $b$, fitting within alined recesses $a'$ $a'$ in both the lower parallel members $a$. The recesses $a'$ and $b'$ may be of sufficient depth to permit the surfaces of the members $a$ $a$ $b$ $b$, as assembled, to be in the same plane. With the said members assembled, a central rectangular space is formed for the reception of a socket member $c$. The exterior contour of said socket member $c$ is quadrilateral, and it has a circular orifice to receive the butt end of a tree or like object. Said socket member is expansible, so that, by wedging a tree butt in the central orifice, the external, quadrilateral surfaces are forced against the rectangular boundary formed by the members $a$ $a$ $b$ $b$. The expansibility of the socket member may be attained by breaking the continuity of its material, as by the single vertical incision $c'$ shown in Fig. 1, or by forming the socket of several parts, as $c^2$, shown in Fig. 2. Obviously, the rectangular arrangement of the strips $a$ $a$ $b$ $b$ need not be adhered to, and the external contour of the socket $c$ may conform to that of the space provided between said strips for its reception.

The tree butt, when inserted in the socket member, spreads the expansible parts thereof to the limit of their confines within the rectangular or other space, the tree thus becoming tightly wedged within the socket and the latter within the holder.

In practice, the tree butt is slightly tapered to facilitate its insertion in the socket, and the latter may also be slightly tapered if desired.

I claim:

A knockdown holder for Christmas trees and like objects comprising two pairs of parallel strips, crossed and detachably connected, leaving a central space; together with an expansible socket member loosely fitting in said space, to receive an object and be thereby expanded to bind said socket and object within the confines of said space.

Signed at New York in the county of New York and State of New York this 4th day of April A. D. 1910.

WILLIAM POPPENDIECK.

Witnesses:
 F. W. BARKER,
 FREDERICK C. BONNY.